United States Patent
Janz et al.

(10) Patent No.: US 6,775,481 B2
(45) Date of Patent: Aug. 10, 2004

(54) 3R OPTICAL SIGNAL REGENERATION

(75) Inventors: Christopher Janz, Nepean (CA); Patricia Guerber, Draveil (FR); Bruno Lavigne, Antony (FR); David Wolfson, Frederiksberg (DK); Tina Fjelde, Frederiksberg (DK); Allan Kloch, Vanlóse (DK)

(73) Assignee: Alcatel, Paris (FR)

( * ) Notice: Subject to any disclaimer, the term of this patent is extended or adjusted under 35 U.S.C. 154(b) by 515 days.

(21) Appl. No.: 09/755,130

(22) Filed: Jan. 8, 2001

(65) Prior Publication Data

US 2001/0028492 A1 Oct. 11, 2001

(30) Foreign Application Priority Data

Jan. 12, 2000 (FR) .............................. 00 00338

(51) Int. Cl.[7] ........................ H04B 10/00; H04B 10/02; H04B 10/04
(52) U.S. Cl. ........................ 398/175; 398/154; 398/155; 398/201
(58) Field of Search ................................ 398/175, 180, 398/186, 193, 201, 154, 155

(56) References Cited

U.S. PATENT DOCUMENTS

| 5,880,837 | A | * | 3/1999 | Roberts | ....................... 356/450 |
| 5,999,283 | A | | 12/1999 | Roberts et al. | ............. 359/108 |
| 6,046,841 | A | * | 4/2000 | Mahgerefteh et al. | ...... 359/326 |
| 6,282,007 | B1 | * | 8/2001 | Roberts | ....................... 398/155 |

FOREIGN PATENT DOCUMENTS

EP      0 849 622      6/1998

OTHER PUBLICATIONS

L.H. Spiekman, et al., IEEE Photonics Technology Letters, vol. 10, No. 8, pp. 1115–1117, "All–Optical Mach–Zehnder Wavelength Converter with Monolithically Integrated Preamplifiers", Aug., 1998.
G. Raybon, et al., Optical Fiber Communication Conference and The International Conference on Integrated Optics and Fiber Communication, vol. 4, pp. 27–29, "20 GBIT/S All–Optical Regeneration and Wavelenght Conversion Using SOA Based Interferometers", Feb. 21, 1999.

* cited by examiner

*Primary Examiner*—Leslie Pascal
*Assistant Examiner*—Dalzid Singh
(74) *Attorney, Agent, or Firm*—Sughrue Mion, PLLC

(57) ABSTRACT

An optical signal regeneration device having an interferometric structure with two arms. Each of the arms has a medium, the optical power output of which is variable with the optical power input. The first arm receives, through an input coupler, a continuous wave and the signal to be regenerated. The second arm receives through the input coupler, a continuous wave signal and a clock signal. A filter, centered on the continuous wave wavelength, receives the output signal of the interferometric structure through the coupler. The filter output signal constitutes the regenerated 3R signal.

10 Claims, 6 Drawing Sheets

_A_

_B_

_C_

_D_

3R OPTICAL SIGNAL REGENERATION

TECHNICAL FIELD

The invention is located in the field of data transfer optical signal regeneration circuits. It is applicable to transmissions the code of which is or is not with return to zero.

PRIOR ART

The technique is known of using interferometers the arms of which comprise semi-conductor optical amplifiers to make decision windows. These interferometers which use a continuous wave source constituting the output carrier wave may be used in an anti-phase (out of phase) or an in-phase configuration.

When they are used in anti-phase, good non linearity and therefore good reshaping is obtained. However, in this case, the capacity of the converted wave to withstand the signal pulse distortions brought by the line (good chirp qualities) is reduced, when standard fiber is used.

When they are used in phase the capacity of the converted signal to resist signal pulse distortions is improved, but the non linearity is reduced.

An interferometer, the arms of which comprise semi-conductor optical amplifiers, may also be used in conjunction with a recovered clock signal. In this case, in particular when the converter is used in anti-phase, good 3R regeneration is obtained. The capacities of the converted signal to resist line distortions remain good on condition that the clock pulses are of short duration relative to the duration of each of the pulses constituting, together, the signal to be transmitted.

BRIEF DESCRIPTION OF THE DRAWINGS

The use of interferometers the arms of which comprise semi-conductor optical amplifiers, whether in phase or in anti-phase, does not make it possible to obtain good decision window characteristics with a single interferometer. The capacities of the signal obtained to resist line distortions are not good enough for direct use as a transmitter.

Multi-stage architectures are therefore inevitable using known technologies. Moreover, these reconstitution solutions are not necessarily the most practical or the most effective for subsequent insertion of timing by introduction of a clock signal.

The version with clock recovery, although superior from the point of view of the decision window and of the capacity to resist pulse distortions, has however, another drawback.

As the clock signal acts directly as a transmission wave, the capacity for resistance to pulse distortions (chirp) may not be satisfactory. It is dependent on the transmission flow rate and on the device used to recover the clock. The transmission wavelength is also fixed by the clock source. Moreover the clock signal may have a low signal to noise ratio.

The present invention is intended to overcome these drawbacks. Its particular aim is to obtain a device capable of 3R regeneration of a signal the flow rate of which may reach 40 gigabits per second and beyond. Another aim is to reconcile a good decision window with low line pulse distortion while reducing the number of requisite components.

To all these ends the aim of the invention is a device for regenerating an input pulse amplitude modulated optical signal, the device comprising an interferometric structure having a first and a second arm, a non linear optical medium being present on each of the arms, input coupling means coupled to said first and second arms, the first arm receiving through these input coupling means the optical signal to be regenerated, output coupling means, coupled to said first and second arms and delivering an interference signal between signals coming from the first and second arms respectively, a device characterised in that the interferometric structure is such that the output is nil when there is no dynamic phase shift between the two arms, and in that the input coupling means couple additionally:

the first and second arms to a continuous optical wave generator;

the second arm to a clock signal generator of the signal to be regenerated and in that the output of the output coupling means carries the regenerated input optical signal.

BRIEF DESCRIPTION OF THE DRAWINGS

Figure 1:
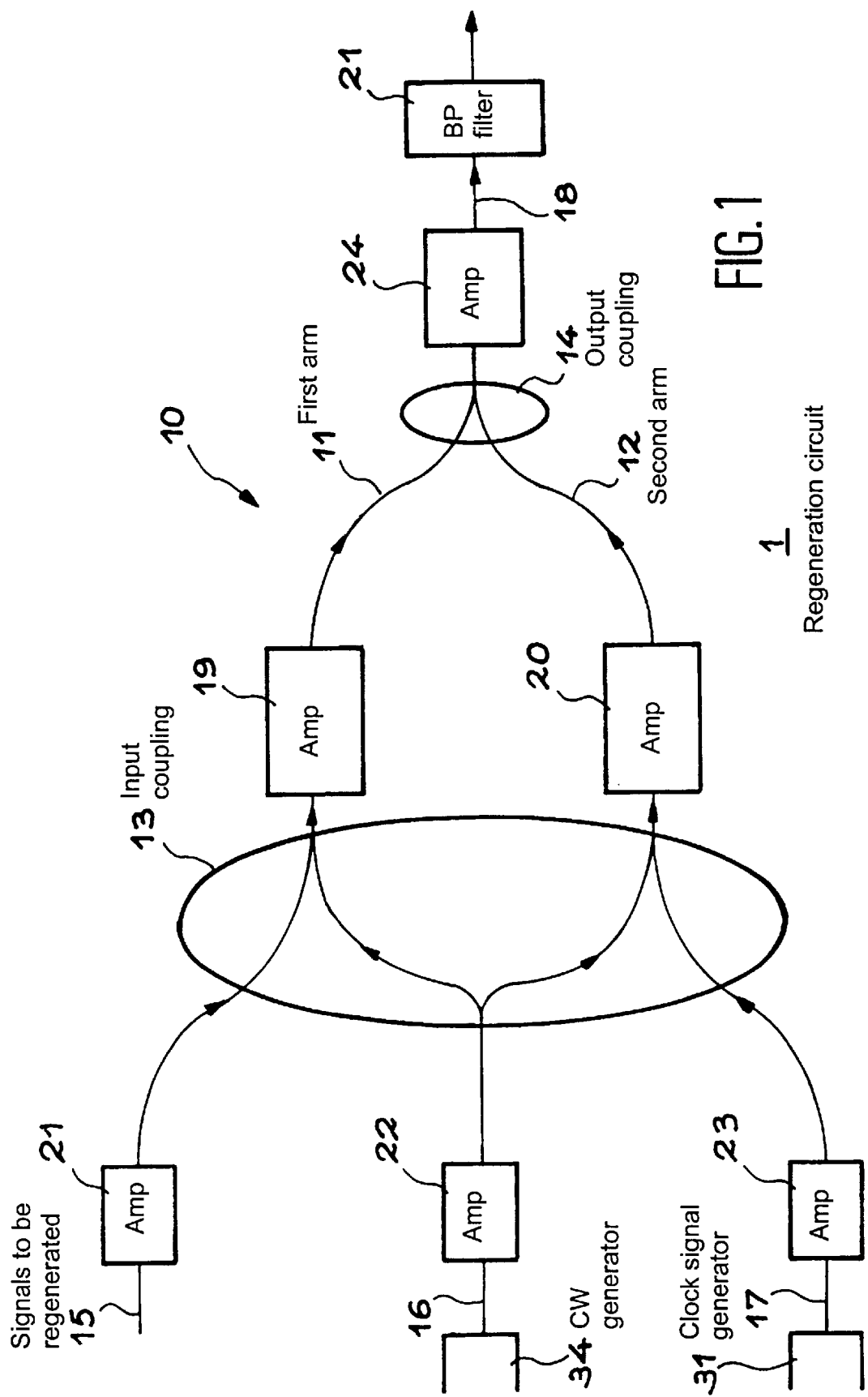
Figure 2:
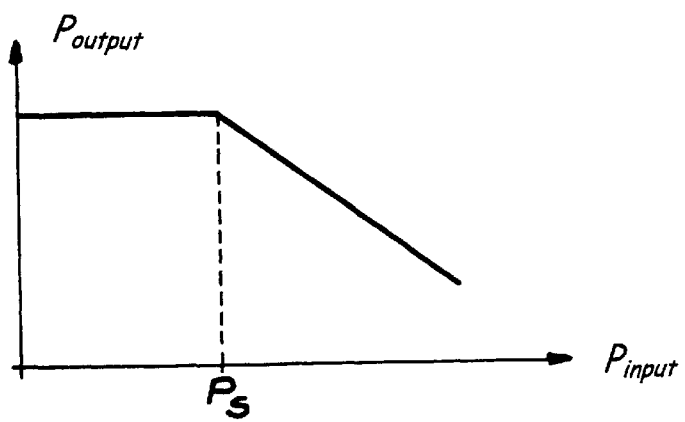
Figure 3:
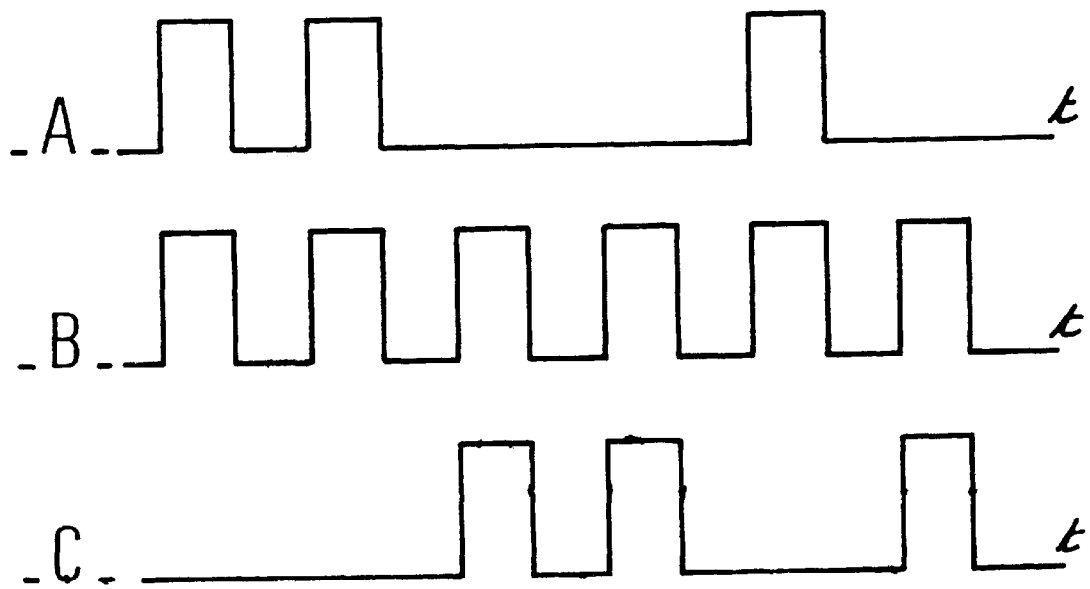
Figure 4:
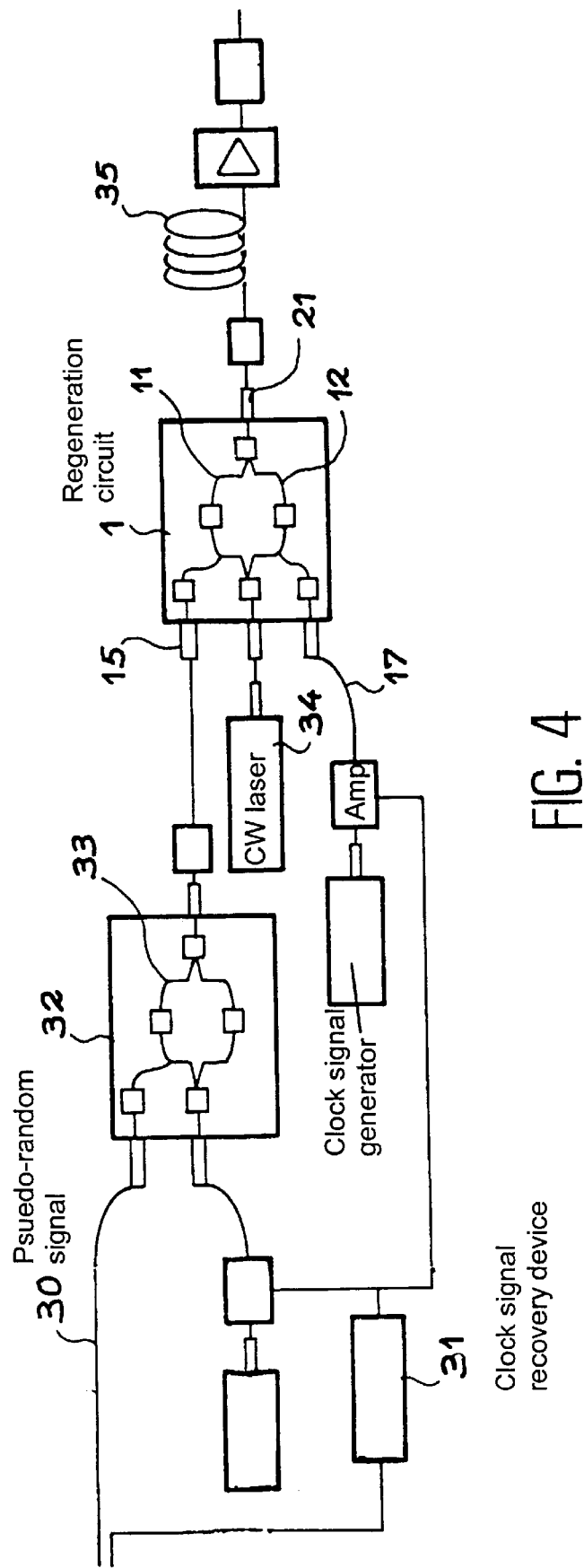
Figure 5:
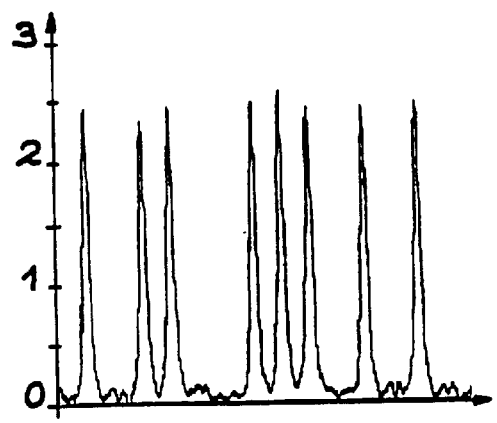
Figure 5:
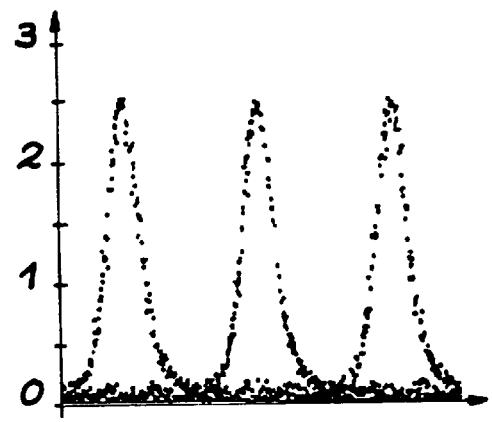
Figure 5:
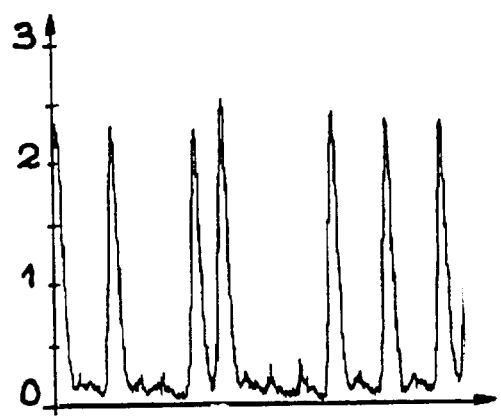
Figure 5:
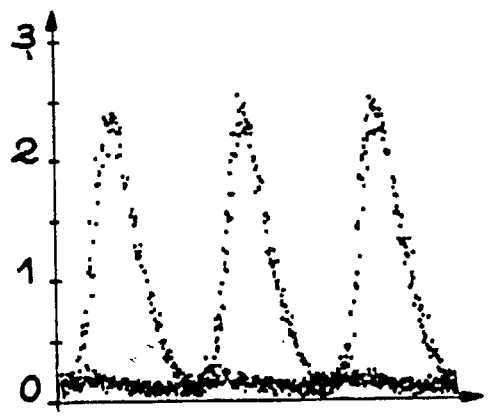
Figure 6:
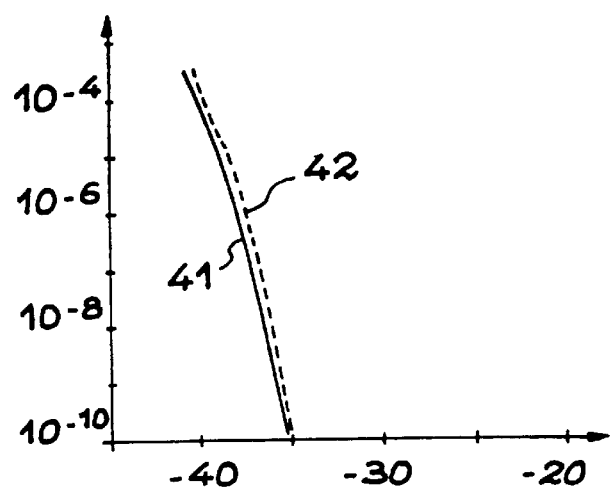
Figure 7:
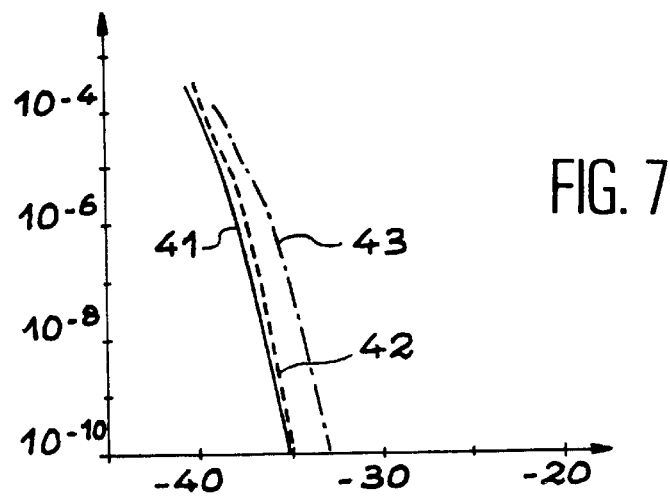
Figure 8:
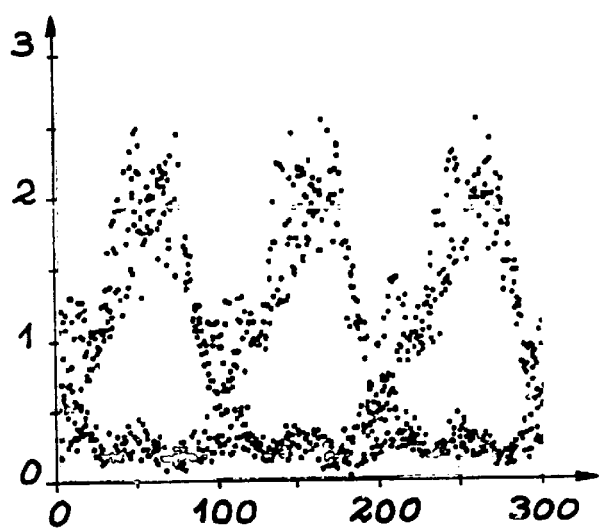
Figure 9:
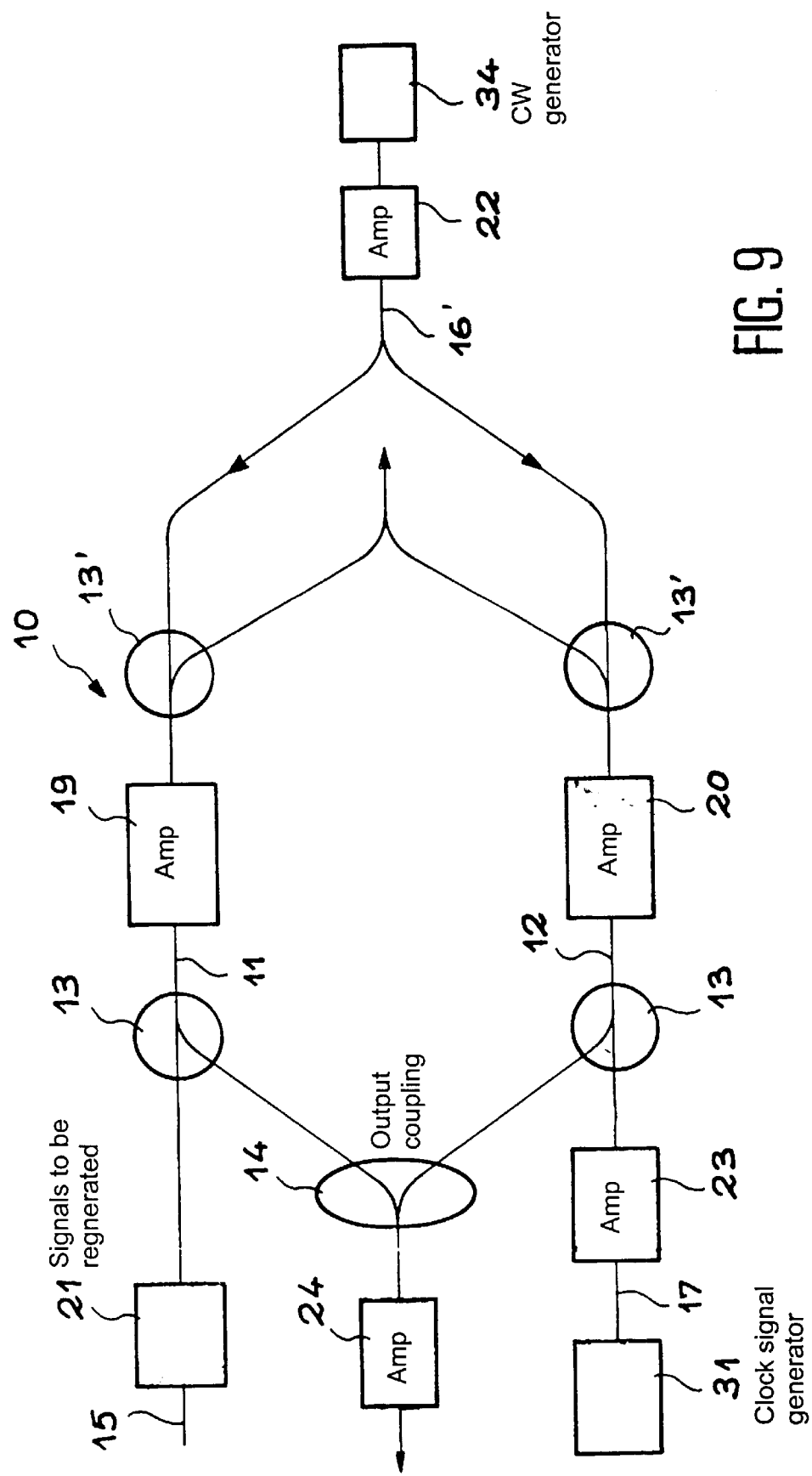

An embodiment example of a device according to the invention, and of the results from transmitting a signal through such a device will now be given and commented on in relation to the appended drawings in which:

FIG. 1 shows diagrammatically a device according to the invention;

FIGS. 2 and 3 are diagrams intended to explain the operation of the invention;

FIG. 4 shows an experimental device intended to test the invention;

FIG. 5 comprises parts A, B, C and D. Parts A and B show the signal trace to be regenerated and its eye diagram respectively;

parts C and D show the signal trace regenerated by the device according to the invention and its eye diagram;

FIG. 6 shows two curves each representing the bit error rate for the signal to be regenerated and for the regenerated signal respectively;

FIG. 7 shows curves each representing the bit error rate for the signal to be regenerated, the regenerated signal and for this same regenerated signal after transmission on a standard single-mode fiber of 31 km;

FIG. 8 shows the eye diagram of the regenerated signal transmitted;

FIG. 9 shows an embodiment variant of the circuit according to the invention shown in FIG. 1.

DESCRIPTION OF AN EMBODIMENT OF THE INVENTION

Comments will now be given on a first embodiment of the invention in relation to FIG. 1.

The regeneration circuit 1 includes an interferometric structure 10, for example a Mach-Zehnder, including a first arm 11 and a second arm 12. Input coupling means 13 couple the first arm 11 to guides, for example, optical fibers 15 and 16. The coupling means 13 couple the second arm 12 to the guide 16 on the one hand, and to a guide 17, for example, an optical fiber.

Output coupling means 14 couple each of the arms 11, 12 to an output guide 18.

Each of the arms 11, 12 comprises a semi-conductor optical amplifier, 19, 20, respectively. The output guide 18 feeds a bandpass filter 21 the output of which constitutes the output of the device 1 according to the invention.

The arm 16 is coupled to a continuous wave generator 34, and the arm 17 to a clock signal generator of the signal to be regenerated, preferably a recoverer of such a signal.

Optionally, each of the input guides 15–17 and the output guide 18 may include optical amplifiers, for example, of the semi-conductor type, 21–23 and 24 respectively, intended to adapt the level of the different signals.

The operation is as follows:

The guide 15 receives the signal to be regenerated. The guide 16 receives the continuous non-modulated optical wave coming from the continuous wave generator 34. The guide 17 receives a clock signal coming from the clock signal generator 31, preferably generating a clock signal reshaped from the signal to be regenerated. The guides 15 and 16 feed the first arm 11.

The medium 19 has a constant optical power output as long as the power input is lower than a threshold then decreasing above this threshold. The curve representing the input optical power is shown in FIG. 2.

The continuous wave power level is set by means of the amplifier 22 to be at a level in the vicinity of or greater than the input level Ps from which the power output reduces.

In these conditions, this continuous wave is, after passing through the medium 19, modulated in power by the power level received by the arm 11 coming from the guide 15. The medium 19 output wave of the arm 11 is therefore modulated by the signal present on the arm 15.

An example of such a modulation is shown diagrammatically in part A of FIG. 3.

In the same conditions, the continuous wave input on the arm 12 is modulated by the clock signal received on this same arm coming from the guide 17.

Thus, the continuous wave present in output from the medium 20 sensitive to the optical power received has the appearance of the clock signal shown in part B of FIG. 3.

The static polarity of the interferometer 10 is selected in such a way that the continuous wave power output is cancelled, when there is no dynamic phase shift between the arms 11, 12. The same situation arises as for an "in phase" wavelength conversion. There may therefore only be an output at 1 if the clock and the signal differ, thus producing a dynamic phase shift between the two arms of the interferometer. This can only occur for a value 0 of the signal.

By destructive interference at coupler level 14, the continuous waves present on each of the arms 11, 12, cancel each other when the arms have a same dynamic phase shift and are retained each time the dynamic phase shifts of each of the arms are different. Thus, an output bit at 1 may only be obtained when the input signal has a 0.

The device 1, according to the invention, thus performs an exclusive-OR logic operation between the clock signal and the signal to be regenerated at the same time as a wavelength conversion.

After filtering, through the bandpass filter 21, centered on the wavelength of the continuous wave present on the input guide 16, the output signal of the device 1, according to the invention has the appearance shown in part C of FIG. 3.

This is a signal whose polarity relative to the input signal is inverted, i.e. the 1 and 0 of the input signal are converted to 0 and 1 respectively of the output signal.

The result of the conversion being carried out "in phase" is a better capacity of the output signal to resist pulse distortions due to line frequency separations (chirp) in the case of a transmission on standard fiber, or on fiber where the net dispersion is in the same direction as on the standard fiber. The use of a clock input on one of the arms procures an increase in the signal conversion speed. The fact of carrying out a signal carrier frequency conversion guarantees an output having a good signal to noise ratio, and removes any potentially awkward spectral characteristic of the recovered clock signal. It should also be noted that the output wavelength may also be freely chosen.

It should be noted that the regeneration is indeed 3R since the output pulses are actually reshaped, re-amplified, and re-timed. Re-timing in particular stems from the fact that an output at the value 1 obtains its shape and its timing from pulses at the value 1 of the clock signal.

It should also be pointed out that the initial polarity of the signal to be regenerated may be recovered by passing the output signal through a second device according to the invention. In such a case, the same clock signal will preferably be used as that present on the guide 17.

The results obtained by means of a device 1 according to the invention will now be commented on in relation to FIGS. 4 to 7.

FIG. 4 shows an experimental assembly intended to feed a device 1 according to the invention and to take measurements on the signals processed.

A brief comment will be made on this assembly.

To the left of the figure a guide 30, for example an optical fiber, receives a pseudo-random signal representing a data transmission.

A clock signal recovery device 31 extracts the clock signal from the signal and delivers the recovered clock signal on the one hand to the guide 17 of the circuit 1 and on the other hand to a circuit 32 intended to change the polarity of the pseudo-random initial signal present on the guide 30.

It will be noted in passing that this circuit 32 represents an example of a signal regeneration circuit used as mentioned in the paragraph relating to the prior art in conjunction with a recovered clock signal.

This circuit 32 essentially comprises an interferometric circuit 33 one arm of which receives the signal coming from the guide 30 and the clock signal.

The second arm receives the recovered clock signal.

Each of the arms comprises semi-conductor optical amplifiers. The level of the clock signal introduced in each of the arms is such that these amplifiers operate in the decreasing part of the curve representing the power output as a function of the power input.

The circuit 32 output signal is a regenerated signal having an inverse polarity to the input signal and the carrier frequency of which is the carrier frequency of the recovered clock signal.

The inverted polarity signal is introduced into the arm 11 of the device 1. Each of the arms 11, 12 of the circuit 1 receives a continuous laser wave coming from a source 34 feeding the guide 16 of the device 1.

At the output of the device 1, the signal present is of the same polarity as the pseudo-random signal feeding the guide 30. This signal passes through an optical fiber 35, which in the experiments conducted by the applicant company was 31 km in length.

The measurements are carried out on the output signal of the device 1 and on the signal after passing through the fiber 35.

FIG. 5 parts A and C, which show the strength in mV of the signal to be regenerated and the regenerated signal respectively as a function of the time in pico seconds, show good signal retention. Likewise, FIG. 5 parts B and D which show the eye diagram of the signal to be regenerated and the regenerated signal respectively show no perceptible shrinkage of the time range in which a decision may be made.

FIG. 6 shows the bit error rate as a function of the power received expressed in dBm (decibels above one milliwatt). The rate for the signal to be regenerated is represented by a curve 41 and by a curve 42 for the regenerated signal. Losses of sensitivity (penalties) are almost negligible for a conversion at 10 gigabits per second.

The regenerated signal transmission capacity is shown by the curves shown in FIGS. 7 and 8. In addition to the curves 41 and 42 shown in FIG. 6, a curve 43 has been shown, representing the bit error rate after a 31 km. line transmission.

The transmission penalty is 1.8 decibels, therefore of the same order of magnitude as the penalty for the transmission over this length of a non regenerated signal.

The eye diagram shown in FIG. 8 confirms these good transmission qualities, which are similar to what may be obtained with an in phase regenerated signal.

Further details on the eye diagrams and on digital transmission are known for example from the manual by A. COZANNET et al. "Optique et communications" published by EYROLLES and CNET ENST 1983, particularly chapter 15.

An embodiment variant of the device according to the invention in which the filter 21 is not necessary will now be described in relation to FIG. 9.

The filter 21 is not necessary if, as shown in FIG. 9, the continuous wave is introduced in the arms 11 and 12 of the interferometer at one end of these arms opposite to that through which the signal to be regenerated and the clock signal respectively are introduced on these arms. In FIG. 9, input coupling means 13 couple respectively, as described in relation to FIG. 1, the input optical signal coming from the arm 15 to the arm 11 and the clock signal to the arm 12. These signals are coupled to a first end of each of these arms. In FIG. 9 a second end of each of these arms is coupled by input coupling means 13' to a continuous wave generation source 34, so that the continuous wave travels in the inverse direction to the signal to be regenerated and to the clock signal.

What is claimed is:

1. A device for regenerating an input pulse amplitude modulated optical signal, the device comprising an interferometric structure having a first arm and a second arm, a non-linear optical medium being present on each of the arms, an input coupling means coupled to said first and second arms, the first arm receiving through said input coupling means the modulated optical signal to be regenerated, an output coupling means coupled to said first and second arms and delivering an interference signal between signals coming from the first and second arms respectively, wherein the interference signal is not present when there is no dynamic phase shift between said first and second arms, and said input coupling means couples:

said first and second arms to a continuous optical wave generator and said input coupling means couples said second arm to a clock signal generator of the signal to be regenerated;

and an output of said output coupling means carries the regenerated input optical signal.

2. A device according to claim 1, wherein the non-linear, optical medium comprises semi-conductor optical amplifiers.

3. A device according to one of the claims 1 or 2, wherein at least one guide, connected to said input coupling means or to said output coupling means, comprises an optical amplifier.

4. A device according to claim 2, further comprising optical power level setting means disposed between said continuous wave generator and each of the semi-conductor optical amplifiers disposed in said first and second arms.

5. A device for regenerating an input pulse amplitude modulated optical signal, the device comprising:

an interferometer having a first arm and a second arm, each arm comprising a non-linear optical medium;

an input coupler that receives the modulated optical signal to be regenerated, a continuous optical wave signal and a clock signal of the signal to be regenerated, wherein the input coupler couples the modulated optical signal and the continuous optical wave signal to the first arm or the interferometer and couples the continuous optical wave signal and the clock signal to the second arm of the interferometer; and an output coupler coupled to said first and second arms and delivering an interference signal between signals coming from the first and second arms respectively, wherein the interference signal is not present when there is no dynamic phase shift between said first and second arms.

6. A device according to claim 5, wherein the non-linear, optical medium comprises semi-conductor optical amplifiers.

7. A device according to claim 5, wherein at least one guide, connected to the input coupler or to the output coupler, comprises an optical amplifier.

8. A device according to claim 5, further comprising optical power level setting means for each of the semi-conductor optical amplifiers disposed in said first and second arms.

9. A device according to claim 5, further comprising a continuous wave generator for the continuous optical wave signal.

10. A device according to claim 9, further comprising an optical power level setting means for the continuous wave generator.

* * * * *